United States Patent [19]
Van Der Lely et al.

[11] 3,899,029

[45] Aug. 12, 1975

[54] ROTARY HARROWS

[76] Inventors: Ary Van Der Lely, 10, Weverskade, Maasland; Cornelis Johannes Gerardus Bom, 36, Esdoornlaan, Rozenburg, both of Netherlands

[22] Filed: May 3, 1973

[21] Appl. No.: 356,840

[30] Foreign Application Priority Data

May 8, 1972 Netherlands.................... 7206172

[52] U.S. Cl. ..................... 172/50; 172/59; 111/10
[51] Int. Cl. ........................................... A01b 33/00
[58] Field of Search ....... 172/59, 68, 484, 438, 776, 172/51, 50, 47; 111/10

[56] References Cited
UNITED STATES PATENTS

| | | | |
|---|---|---|---|
| 2,611,308 | 9/1952 | Morkoski........................... | 172/484 |
| 3,810,434 | 5/1974 | Van Der Lely et al........... | 172/59 X |
| 3,826,314 | 7/1974 | Van Der Lely et al............. | 172/59 |

FOREIGN PATENTS OR APPLICATIONS

| | | | |
|---|---|---|---|
| 1,940,988 | 12/1970 | Germany.......................... | 172/438 |

*Primary Examiner*—Stephen C. Pellegrino
*Attorney, Agent, or Firm*—Mason, Mason & Albright

[57] ABSTRACT

A rotary harrow has a forward coupling frame for connection to a prime mover and a rear coupling member. Upper and lower arms link the coupling frame to the rear coupling member and form a parallelogram linkage. A frame portion has upright shafts journalled therein with depending soil working members that extend across the width of the frame portion. A soil smoothing roller is pivotally connected at the rear of the harrow to support same, at least in part, and two hoppers are mounted above the soil working members. A rotary delivery mechanism in each hopper is driven by a take off from the roller to dispense material in front of the soil working members. The frame portion with soil working members as well as the roller, can each can pivot on the parallelogram linkage to move vertically, matching undulations of the ground independently of the forward coupling frame.

17 Claims, 4 Drawing Figures

ROTARY HARROWS

Some harrow machines suffer from the disadvantage that too much weight is borne by the supporting member so that it is pressed into the soil to an extent such that, particularly on soft, wet or sticky soil, a large amount of the soil adheres. This is generally undesirable and reduces working efficiency.

According to the invention, there is provided a rotary harrow of the kind set forth, wherein the frame portion is upwardly and downwardly movable relative to the coupling frame at least during the use of the harrow.

Figure 1:
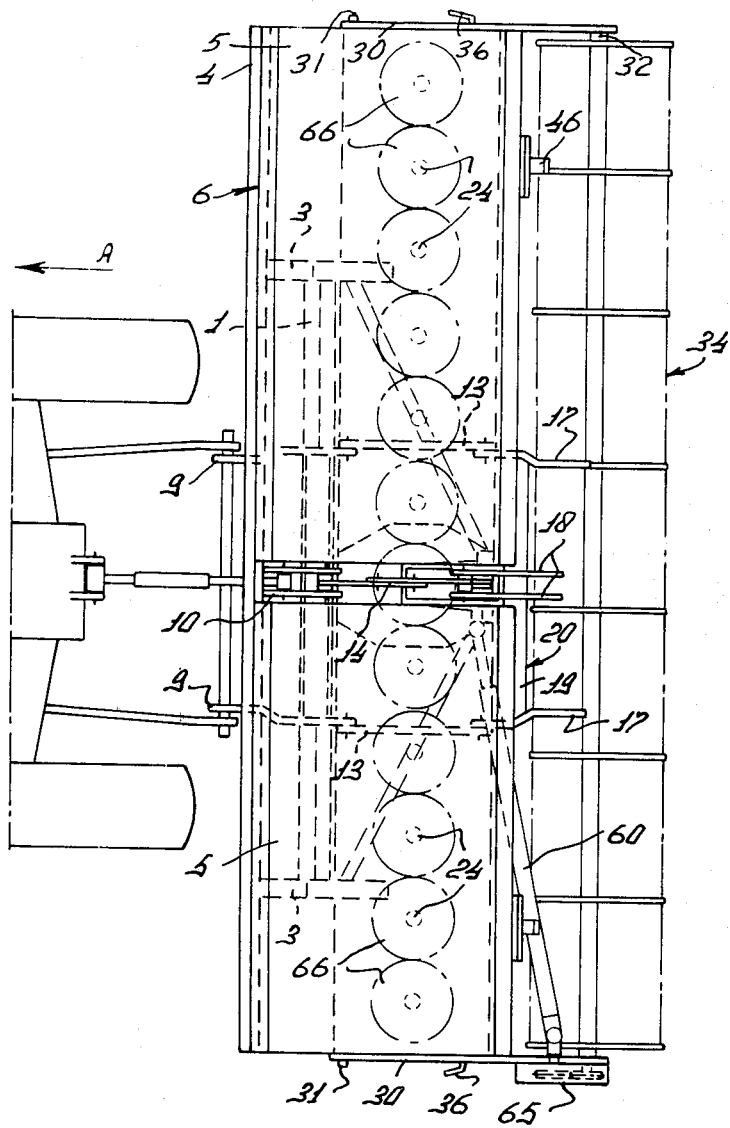
Figure 2:
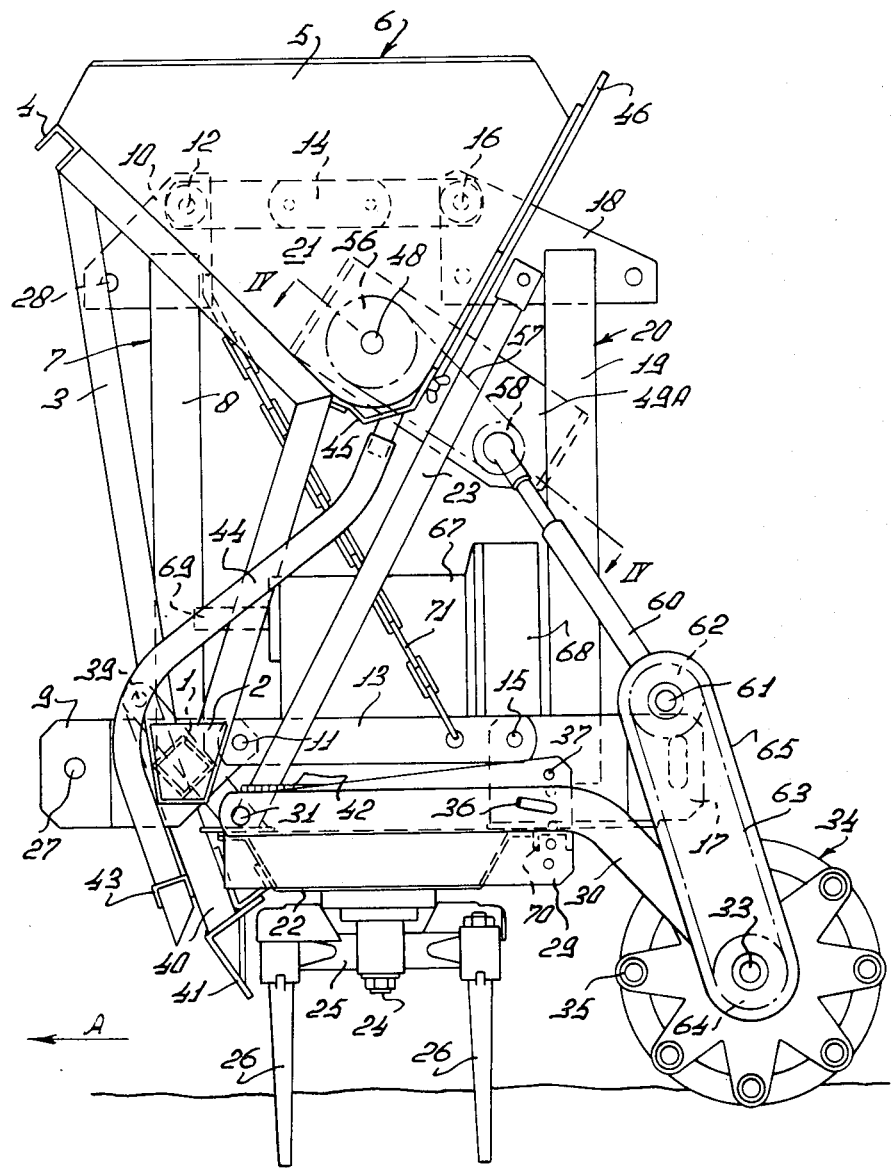
Figure 3:
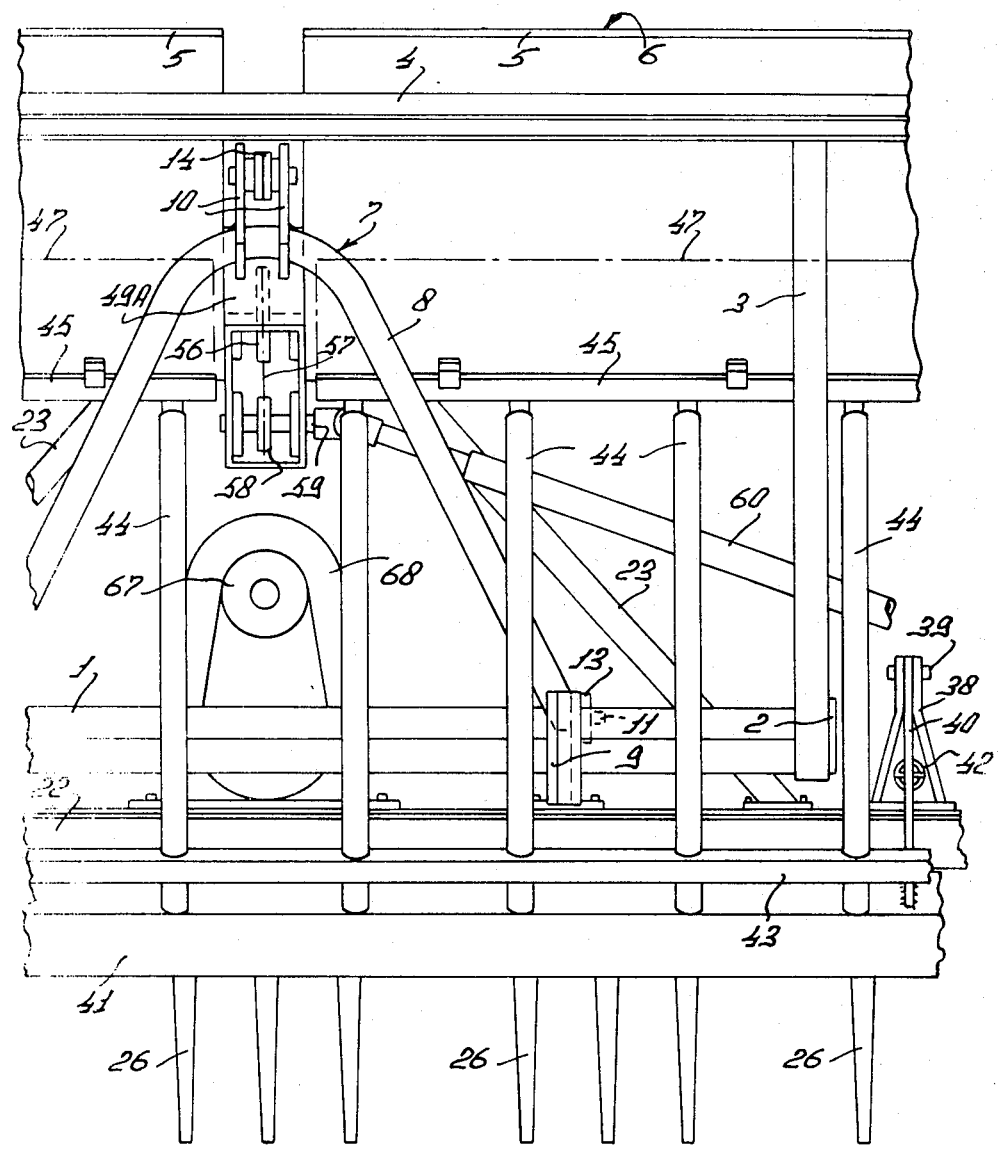
Figure 4:
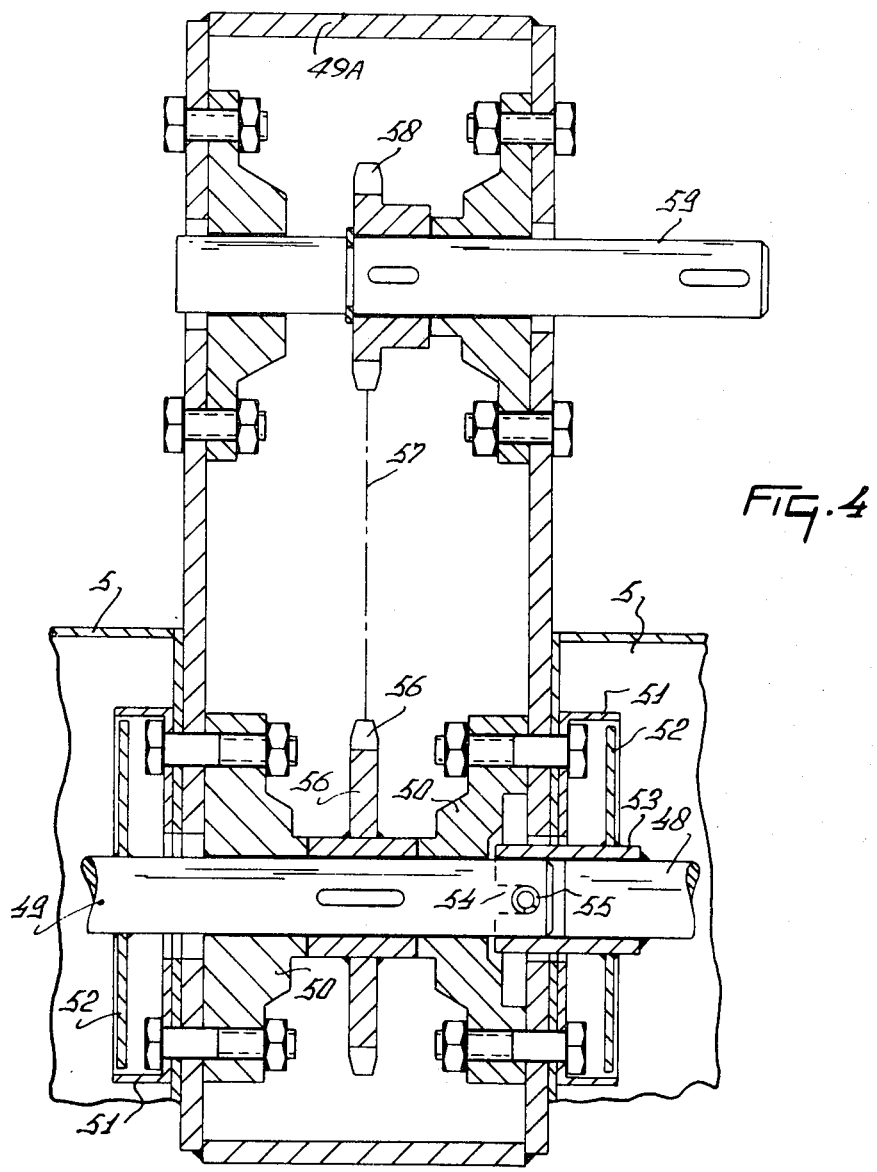

For a better understanding of the invention, and to show how the same may be carried into effect, reference will now be made, by way of example, to the accompanying drawings, in which:

FIG. 1 is a plan view of a rotary harrow in accordance with the invention mounted at the rear of an agricultural tractor, FIG. 2 is a side elevation, to an enlarged scale, of the rotary harrow of FIG. 1, FIG. 3 is a partial front elevation, to the same scale as FIG. 2, of the rotary harrow of FIGS. 1 and 2, and FIG. 4 is a section, to an enlarged scale, taken on the line IV—IV of FIG. 2.

Referring to the drawings, the rotary harrow which is illustrated has a frame that includes a hollow frame beam 1 of square cross-section that extends substantially horizontally perpendicular to the intended direction of operative travel of the harrow which is from right to left as seen in FIGS. 1 and 2 of the drawings. As can be seen in FIG. 2 of the drawings, the beam 1 is arranged in such a way that one of the diagonals of its cross-section is substantially vertically disposed. Substantially vertical plates 2 are secured to the beam 1 at its opposite ends and upwardly extending supports 3 are fastened to those plates. The upper ends of the two supports 3 are rigidly interconnected by a beam 4 of channel-shaped cross-section that extends parallel to the beam 1. The supports 3 and beam 4 assist in carrying two substantially horizontally aligned hoppers 5 that form part of a mechanism, generally indicated by the reference 6, for delivering material onto or into the soil.

The frame beam 1 is provided, near its center, with a bracket-shaped coupling member 7 having limbs 8 that are secured to the frame beam 1 by substantially vertical plates 9. The frame beam 1 and the coupling member 7 together afford a coupling frame by which the harrow may be connected to the three-point lifting device or hitch of an agricultural tractor or other operating vehicle in the manner which is indicated in outline in FIG. 1 of the drawings. At the top of the coupling member 7, the web between the limbs 8 thereof is provided with horizontally spaced apart vertical plates 10 and it will be seen from FIGS. 2 and 3 of the drawings that an arm 14 that is connected to said plates 10 by a horizontal pivot 12 projects rearwardly from the plates 10 with respect to the intended direction of operative travel of the harrow. Similarly, arms 13 are turnably connected to the rear extremities of the plates 9 by horizontal pivots 11 and project to the rear from said plates 9. The rear ends of the arms 13 are turnably connected to vertical plates 17 by horizontal pivots 15 and, similarly, the rear end of the arm 14 is turnably connected to substantially vertical plates 18 by a horizontal pivot 16.

The plates 17 are fastened to the lower ends of the limbs 19 of a second bracket-shaped coupling member 20 and the plates 18 are fastened to the web of the bracket in closely spaced apart relationship between the limbs 19. The arms 13 and 14 and the coupling members 7 and 20 together afford a parallelogram linkage that is generally indicated by the reference 21, it being noted that, when the harrow is seen in side elevation (FIG. 2), the arms 13 and 14 afford the shorter sides of the parallelogram. However, as seen in plan view (FIG. 1), the arm 14 is located substantially midway between the two arms 13, it being noted that the arm 14 is mounted in its appointed position by forming it as two portions that are interconnected in overlapping relationship. As seen in side elevation (FIG. 2), the two forward and the two rearward corners of the parallelogram linkage 21 are respectively located in substantially vertical alignment.

The limbs 19 of the second coupling member 20 are secured by the plates 17 to the rear of a hollow box-shaped frame portion 22 that extends substantially horizontally perpendicular to the intended direction of operative travel of the harrow and parallel to the beams 1 and 4. The frame portion 22 forms part of the frame of the harrow and supports 23 interconnect its upper leading edge and the plates 18 immediately in front of the uppermost web of the bracket-shaped second coupling member 20. The frame portion 22 is located beneath the parallelogram linkage 21 and rotatably supports a plurality, such as twelve, of upwardly extending substantially vertical shafts 24 that are spaced apart from one another at regular intervals of substantially 25 centimeters. The lowermost end of each shaft 24 projects downwardly from beneath the bottom of the frame portion 22 and has a corresponding substantially horizontal tine support 25 secured to it. The opposite ends of each tine support 25 carry substantially vertical holders in which upper fastening portions of soilworking tines 26 are firmly but releasably secured. During the operation of the harrow, the tined soil working members or rotors that are mounted at the lower ends of the shafts 24 work corresponding strips of land each of which has a preferred width of substantially 30 centimeters. Since this width is materially larger than the preferred distances between neighbouring shafts 24, the strips of land that are worked by the individual members overlap one another to produce a single broad strip of worked soil having substantially the same width as the overall width of the harrow itself. The soil working members or rotors corresponding to neighbouring shafts 24 are, of course, angularly staggered around the axes of those shafts in such a way as to prevent the supports 25 or tines 26 from fouling one another during rotation of the shafts 24.

Each of the plates 9 is formed towards its front with a corresponding hole 27 for connection with the free end of a corresponding lower lifting link of the three-point lifting device or hitch of the operating agricultural tractor or other vehicle and, similarly, leading regions of the neighbouring plates 10 are formed with horizontally aligned holes 28 for connection to the free end of the adjustable upper lifting link of the same lifting device or hitch. This arrangement is illustrated in outline in FIG. 1 of the drawings where a single long substantially horizontal shaft is shown entered through both holes 27 to afford the two pivotal connections between the plates 9 and both lower lifting links.

Substantially vertical sector plates 29 are fastened to the opposite lateral ends of the frame portion 2 and arms 30 are turnable upwardly and downwardly alongside those plates about substantially horizontally aligned pivot pins 31 mounted near the top and front of the frame portion 22 with respect to the intended direction of operative travel of the harrow. Rearmost regions of the two arms 30 are bent over downwardly and their lowermost ends carry horizontal bearings 32 arranged to receive horizontal stub shafts 33 at the opposite ends of a rotary supporting member 34 in the general form of an open ground roller. The rotary supporting member 34 has a plurality, such as eight, of peripheral groundengaging tubular elements 35 that are supported by a plurality, such as eight, of substantially vertical plates horizontally spaced apart from one another at regular intervals along the central axis of rotation of the supporting member 34. The tubular elements 35 may extend parallel to the axis of rotation or may be wound helically around that axis. Horizontal locking pins 36 are provided for entry through single holes in the arms 30 and through chosen holes 37 in curved rows thereof that are formed close to the rearmost edges of the sector plates 29 at equal distances from the pivot pins 31. It will be apparent that the particular holes 37 that are chosen to cooperate with the locking pins 36 dictate the level of the axis of rotation of the rotary supporting member 34 relative to the level of the frame portion 22 of the harrow and are a principal factor in determining the depth of penetration of the tines 26 into the ground surface during a harrowing operation.

Upwardly and forwardly projecting supports 38 (FIG. 3) are secured to the top of the frame portion 22 at the front thereof and the free upper ends of said supports 38 have arms 40 turnably connected to them by substantially horizontal pivot pins 39. There are two pivot pins 39 that define substantially a single axis that extends parallel to the frame beams 1 and 4. The lower ends of the arms 40 carry a screen 41 that is afforded principally by a bar of angular or L-shaped cross-section, said screen 41 being secured to the arms 40 so as to extend parallel to the beams 1 and 4 at the general level of the tine supports 25 and the fastening portions at the upper ends of the tines 26. The lowermost extremity of the screen or bar 41, which extends throughout the working width of the harrow, is located at a level below that of the bottoms of the tine holders carried at the opposite ends of the tine supports 25 and its upper extremity is located well above the tops of those holders. Helical tension springs 42 that extend substantially parallel to the intended direction of operative travel of the harrow interconnect the arms 40 and anchorages (not visible) at the top and rear of the frame portion 22. The springs 42 normally act to hold the screen 41 in substantially the position shown in FIG. 2 of the drawings in which the arms 40 and screen 41 bear against stops but said screen 41 can turn forwardly about the axis defined by the pivot pins 39, against the action of the springs 42, upon a large stone or the like becoming wedged between the screen and one or more of the tine supports 25 or one or more of the tines 26 and/or their holders.

A beam 43 of inverted channel-shaped cross-section is secured to the fronts of the two arms 40 just above the screen 41 so as to extend substantially parallel to the beams 1 and 4. The beam 43 is formed with openings at regular intervals along its length and delivery members in the form of pipes or tubes 44 are entered through the openings. The upper ends of the pipes or tubes 44 communicate with corresponding outlet ports in the bottom of the two hoppers 5, these ports being capable of being completely closed, or opened to a desired extent, by apertured masking plates 45 (one plate 45 in respect of each hopper 5) that are movably connected to the bottoms of the two hoppers so as to be capable of being reciprocated in the directions of length of those hoppers by corresponding control levers 46 (FIGS. 1 and 2). Each hopper 5 contains a corresponding rotary delivery member 47 and these members 47 comprise bladed elements in register with each of the outlet ports of the two hoppers. When the members 47 rotate, the blades of said elements move close to the inner ends of said outlet ports and ensure that material within the hoppers 5 is fed evenly through the outlet ports to the pipes or tubes 44 when those outlet ports are more or less open. Stub shafts 48 and 49 (FIG. 4) project towards one another from the facing ends of the two hoppers 5, said stub shafts 48 and 49 being surrounded by a protective casing 49A. The stub shaft 49 is much longer than the stub shaft 48 and is received in two horizontal bearings 50 that are secured to the respective facing ends of the two hoppers 5, and to the casing 49A, by small bolts. The small bolts that have just been mentioned also secure collars or rings 51 to the internal surfaces of the facing ends of the two hoppers 5 and the two stub shafts 48 and 49 carry disc-like closing plates 52 that are arranged to rotate inside the collars or rings 51 with a minimum of clearance so as to prevent any appreciable quantities of material from the inside of the hoppers reaching the bearings 50. The stub shaft 48 of the delivery member 47 that is located in the left-hand hopper 5 when the harrow is viewed in its intended direction of travel is provided with a surrounding sleeve 53 formed with an end recess 54 that receives a transverse pin 55 mounted at the end of the stub shaft 49. The co-operation of the pin 55 with the sleeve 53 ensures that the two delivery members 47 will rotate in unison.

A sprocket wheel 56 is keyed to the stub shaft 49 between the two bearings 50 inside the casing 49A and a transmission chain 57 is passed around said sprocket wheel 56 and around a further smaller sprocket wheel 58 that is keyed to a shaft 59 one end of which is connected by a universal joint (FIG. 3) to the end of a telescopic transmission shaft 60. The telescopic transmission shaft 60 extends generally towards one end of the frame portion 22 and is connected by a further universal joint (FIG. 1) to a rotary shaft 61 (FIG. 2) at the upper end of a chain casing 65. The end of the shaft 61 that is located inside the casing 65 carries a sprocket wheel 62 that is linked by a transmission chain 63 to a further sprocket wheel 64 located inside the lower end of the casing 65 at the outer end of one of the stub shafts 33 of the rotary supporting member 34 that cooperates with a corresponding one of the two substantially horizontal bearings 32.

The shafts 24 to which the rotary soil working members or rotors are secured each carry, inside the hollow frame portion 22, a corresponding straight- or spur-toothed pinion 66 and it will be seen from FIG. 1 of the drawings that the teeth of each pinion 66 are in mesh with those of the neighbouring pinion or each of the two neighbouring pinions. One of the center pair of shafts 24 has an upward extension which projects into a gear box 67, said gear box 67 having a rotary input shaft 69 that projects forwardly therefrom and that can be placed in driven connection with the power take-off shaft of an operating tractor or other vehicle by way of a telescopic transmission shaft (not shown) of a construction that is known per se having universal joints at its opposite ends. It will be noted that a change-speed gear 68 is provided at the rear of the gear box 67 and it should be explained that pinions contained within the casing of the change-speed gear 68 can be arranged in different combinations between the rotary input shaft 69 and a further relatively parallel shaft (not visible) of the gear box 67 to enable a plurality (preferably four) of different output speeds to be chosen in response to a single input speed of rotation applied to the shaft 69. In this way, a speed of movement of the tines 26 through the soil can be chosen that is most appropriate to the particular soil and weather conditions under which the harrow is operating.

In the use of the harrow which has been described, the coupling frame that is afforded by the beam 1 and the coupling member 7 is connected to the three-point lifting device or hitch of an agricultural tractor or other operating vehicle in the manner that is shown in outline in FIG. 1 of the drawings and the leading splined or otherwise keyed end of the rotary input shaft 69 is placed in driven connection with the power take-off shaft of the same tractor or other vehicle in the manner mentioned above. As the harrow is moved over ground that is to be worked by its tines 26, the shafts 24 will be rotated from the gear box 67 in such a way that each of them revolves in a direction opposite to its neighbour or both of its neighbours. The tines 26 of each rotary soil working member or rotor work a corresponding narrow strip of land but, as discussed above, said strips of land overlap one another so as to form a single broad strip whose width is substantially equal to the overall width of the harrow. Any stones or the like that may be encountered are deflected away from the upper ends of the tines 26 and their supports 25 by the screen 41 so that damage from this cause is brought to an absolute minimum. As previously mentioned, any stone or the like that becomes momentarily wedged or jammed behind the screen 41 will not cause damage or breakage because the screen can deflect forwardly against the action of the springs 42 to allow the stone or other obstacle to fall away. The supporting member 34 rolls over the strip of soil that has been worked by the tines 26 immediately behind those tines and, because of the provision of the parallelogram linkage 21, both the supporting member 34 and the frame portion 22 carrying the rotary soil working members or rotors can move upwardly and downwardly to match undulations in the surface of the soil independently of the coupling frame connected to the three-point lifting device or hitch of the operating tractor or other vehicle. The upward and downward movements of the supporting member 34 and frame portion 22 that are possible take place in directions substantially parallel to the axes of rotation of the shafts 24.

The two hoppers 5, each of which has a length equal to approximately half the length of the frame portion 22, are fixed in position relative to the coupling frame afforded by the beam 1 and the coupling member 7 and their rotary delivery members 47 are driven from the supporting member 34, through the intermediary of the telescopic transmission shaft 60 and its universal joints, in such a way as to supply fertiliser, seeds and the like (with or without pesticides and/or fungicides) onto the soil through the pipes or tubes 44 immediately in front of the rapidly rotating tines 26. It will be obvious that the tines 26 mix the fertiliser, seeds or the like thoroughly with the soil and that the soil is subsequently compressed to some extent by the roller-like rotary supporting member 34. Such an arrangement is particularly useful for the sowing of grass seeds and other small seeds that are preferably sown at random rather than in rows. Seeds can also be sown onto or into the soil in more or less straight rows by entering the flexible pipes or tubes 44 through alternative openings in a beam 70 (FIG. 2) of inverted channel-shaped cross-section that is located just behind the rotary soil working members or rotors with respect to the intended direction of operative travel of the harrow but in front of the soil-compressing rotary supporting member 34. Furrow-producing coulters or the like may be provided when required. Separate hoppers may, if desired, be provided for fertilisers and seeds.

Since the drive from the rotary supporting member 34 to the delivery members 47 comprises universal joints and the telescopic transmission shaft 60, no interference to this drive is caused when the supporting member 34 and the frame portion 22 move upwardly and/or downwardly relative to the coupling frame as the harrow moves over undulations in the soil during a harrowing or harrowing and/or fertilising and/or seed sowing operation. The second coupling member 20 at the rear of the harrow may be employed for the connection thereto of further implements such as a planting machine or the like. Since the frame portion 22 which carries the soil working members or rotors and the rotary supporting member 34 can move upwardly and downwardly independently of the coupling frame and the hoppers 5 by virtue of the provision of the parallelogram linkage 21, substantially only the weight of the frame portion 22, the soil working members or rotors, the gear box 67 and the change-speed gear 68 is sustained by the rotary supporting member 34. That member 34 is thus not pressed downwardly into the freshly worked soil to an excessive extent so that the supporting member 34, which is of open construction, has no great tendency to become filled with mud and earth which could otherwise be a problem particularly on very heavy and/or wet soil. The hoppers 5 are located towards the front of the harrow so that, during inoperative transport, the three-point lifting device or hitch of the transporting tractor or other vehicle is not loaded to too great an extent. At least one chain 71 is provided that may be stretched between at least one of the plates 10 and one of the arms 13 before the harrow is brought to an inoperative transport position in which it is lifted clear of the ground by the raised three-point lifting device or hitch of a transporting tractor or other vehicle. The or each chain 71 thus prevents the arms 13 and 14 from turning too far downwardly about the axes of the pivots 11 and 12 under the weight of the rotary supporting member 34 and the parts that are movable upwardly and downwardly therewith, including any additional implement that may be connected to the second coupling member 20.

Although various features of the rotary harrow that has been described and/or illustrated in the accompanying drawings will be set forth in the following claims

What we claim is:

1. A rotary harrow comprising frame means including a forward coupling frame and a transverse frame portion supporting a plurality of tines soil working members, drive means connected to said soil working members to rotate same about upwardly extending axes, said transverse frame portion being interconnected to linkage means and the latter including said forward coupling frame, said frame portion being pivotally coupled to said forward coupling frame and vertically displaceable relative to said coupling frame, the rear of said linkage means being affixed to said frame portion, a soil contacting supporting member located to the rear of said frame portion and said supporting member being adjustably fastened to said frame portion, said frame portion together with said supporting member being vertically displaceable to match ground undulations independently of said forward coupling frame.

2. A harrow as claimed in claim 1, wherein at least one hopper is supported on said frame means above said frame portion and delivery members extend down from said hopper to a location forward of said soil working members.

3. A harrow as claimed in claim 2, wherein said hopper extends throughout substantially half the lateral width of said frame portion.

4. A harrow as claimed in claim 2, wherein two hoppers are supported on said frame means and said hoppers are located side-by-side.

5. A harrow as claimed in claim 1, wherein two hoppers are supported on said frame means above the frame portion and a delivery mechanism is rotatably mounted in said hopper, a drive for operating said mechanism being in driving connection with said roller.

6. A harrow as claimed in claim 5, wherein said drive comprises transmission members that extend between said two hoppers to a common shaft means and said shaft means comprises said delivery mechanism.

7. A harrow as claimed in claim 1, wherein, when viewed inside elevation, there are two forward and two rearward corners of said linkage means which are respectively located in substantially vertical alignment.

8. A harrow as claimed in claim 7, wherein, when viewed in plan, an upper arm of said linkage means is located between two horizontally spaced apart lower arms thereof.

9. A harrow as claimed in claim 8, wherein said upper and lower arms of the linkage means normally extend substantially parallel to the direction of travel.

10. A harrow as claimed in claim 9, wherein the leading ends of said upper and lower arms are pivotally connected to a forward coupling element of said coupling frame and said coupling element has connection points for a three-point lifting device or hitch of an agricultural tractor.

11. A harrow as claimed in claim 10, wherein the rear ends of said arms are pivotally connected to plate means affixed to said frame portion and said plate means has connection means for a further three-point connection thereto of a further implement at the rear of the harrow.

12. A harrow as claimed in claim 1, wherein flexible means interconnects said coupling frame to another portion of said linkage means to limit movements of said frame portion in a downward direction relative to said coupling frame.

13. A harrow as claimed in claim 12, wherein said flexible means comprises at least one chain that is secured between said coupling frame and said frame portion.

14. A harrow as claim in claim 1, wherein said supporting member is a roller.

15. A harrow as claimed in claim 14, wherein said roller is pivotally connected to said frame portion with an adjusting mechanism and fixable in any of a plurality of settings with respect to said frame portion, whereby the working depths of said soil working members can be regulated.

16. A harrow as claimed in claim 15, wherein said roller extends throughout substantially the whole transverse width of said frame portion.

17. A rotary harrow comprising frame means including a forward coupling frame, a rear coupling frame member and a transverse frame portion, said frame portion supporting a plurality of tined soil working members, drive means connected to said soil working members to rotate same about upwardly extending axes, said frame portion being interconnected to a linkage means and the latter including said forward and said rear coupling frame, said frame portion being pivotally coupled to said forward coupling frame and having at least one fixed connection to said rear coupling frame member, a supporting roller being connected in fixed relationship to said frame portion at the rear thereof, whereby said roller and frame portion are vertically displaceable to match ground undulations independently of the forward coupling frame.

* * * * *